UNITED STATES PATENT OFFICE.

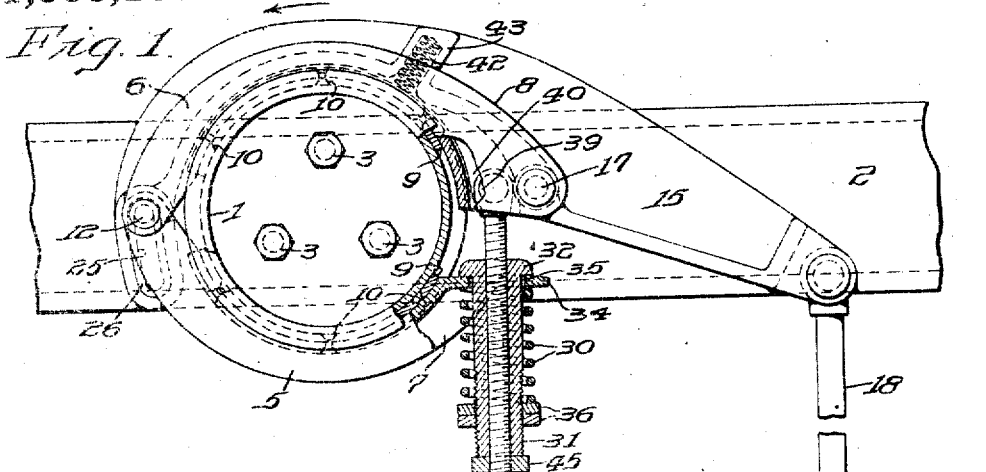
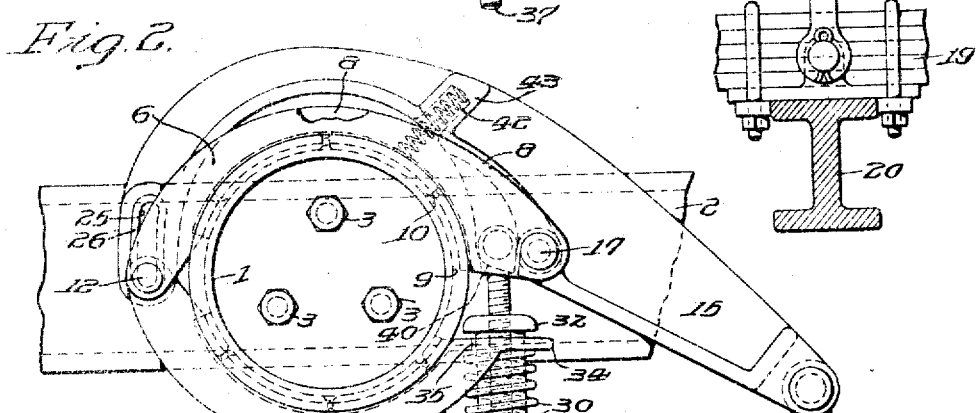
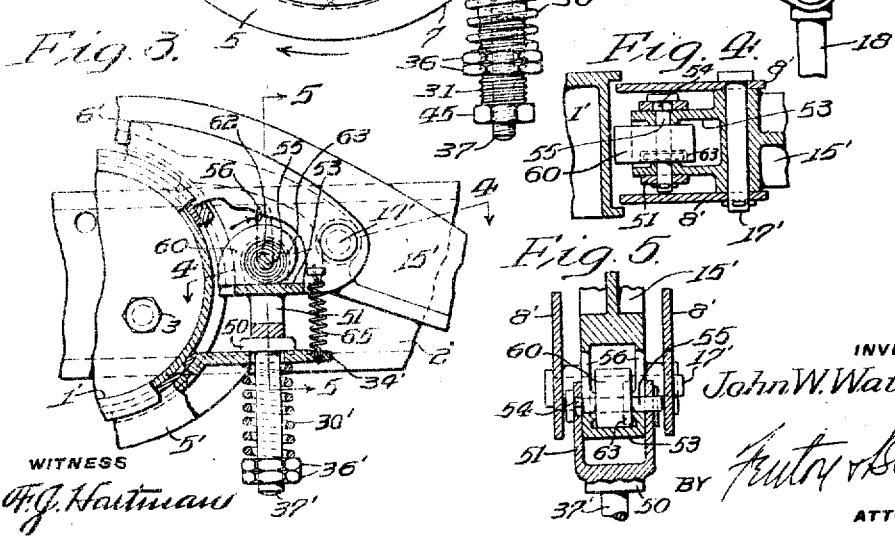

JOHN W. WATSON, OF WAYNE, PENNSYLVANIA.

RECOIL-CHECK.

1,308,130.

Specification of Letters Patent.

Patented July 1, 1919.

Application filed July 29, 1916. Serial No. 111,965.

*To all whom it may concern:*

Be it known that I, JOHN W. WATSON, a citizen of the United States, and a resident of Wayne, county of Delaware, and State of Pennsylvania, have invented certain new and useful Improvements in Recoil-Checks, of which the following is a specification, reference being had to the accompanying drawing.

My invention more especially relates to recoil or rebound checks for automobiles and other vehicles in which it is desirable to control and modify the recoil or rebound caused by the action of the springs in tending to assume their normal position after deflection, although, if desired, my invention may be employed in connection with any other mechanism for the purpose of permitting substantially free relative movement of two bodies in one direction and of retarding their relative movement in the opposite direction and, as a feature thereof, includes means for automatically compensating for wear of parts of the mechanism, which include certain friction members, and obviously this feature of the invention may be applied to any construction where friction between movable members is applied and the parts are so associated that wear will throw the mechanism out of adjustment. My invention comprehends broadly any automatic means for compensating for wear in a mechanism of such a character and this feature of the invention is not limited to recoil checks but has a wide range of adaptability in connection with various kinds of friction mechanisms.

An object of my invention is to provide means for retarding the relative movement of two bodies in one direction while permitting their unretarded movement in the opposite direction and which, when applied to an automobile or other vehicle, will preferably serve to check the recoil or upthrow of the vehicle springs without interfering with their compression, thus modifying and checking the upthrow of the spring-supported portions of the vehicle, and thereby minimizing the danger of spring breakage, assisting in keeping the wheels of the vehicle in contact with the road and improving the riding qualities of the vehicle.

My invention further includes all of the other various objects and novel features of construction and arrangement hereinafter more definitely specified and described.

In the accompanying drawing, I have illustrated certain forms of my invention as embodied in a recoil or rebound check adapted for attachment to an automobile or other vehicle, Figure 1 being a side elevation of one form thereof partially in section with certain portions broken away for the sake of clearness and showing the invention attached to an automobile, and Fig. 2, a similar view showing certain parts of the invention in a different position than as shown in Fig. 1. In Figs. 3, 4 and 5, I have illustrated a slightly modified form of the invention, Fig. 3 being a fragmentary side elevation with the various parts in the same relative position as shown in Fig. 1, and Figs. 4 and 5 being fragmentary sections taken respectively on lines 4—4 and 5—5 in Fig. 3.

Briefly, my invention comprises relatively movable members and means operative to permit the substantially free relative movement of said members in one direction and to resist the movement of said members in the other direction and for this purpose I may employ any suitable means and instrumentalities adapted to perform the functions desired.

That form of the invention shown in Figs. 1 and 2 of the drawing comprises a flanged drum 1 arranged for fixed attachment to the frame 2 or other suitable portion of a vehicle or the like by bolts 3, said drum being preferably embraced by a pair of shoes 5, 6, each substantially semi-circular in contour and provided with outwardly extending flanges 7, 8. Each shoe may preferably be lined with suitable frictional material 9 secured in position by rivets 10, the shoes being hinged together at one end upon a suitable transversely extending pin 12 which passes through suitable apertures in the shoe flanges.

For the purpose of allowing substantial freedom of movement, when the parts are relatively rotated in one direction, between the drum and the shoes, which latter as hereinafter described may be connected with the axle of the vehicle, and to cause the shoes to grip the drum and thus tend to retard the relative movement of the parts when rotated in the other direction, I may employ any suitable means, those shown in Figs. 1 and 2 comprising an arm 15 curved adjacent one end in substantial conformity with the exterior of one of the shoes, for example, the upper shoe 6, and adapted to fit loosely between the flanges 8 of said shoe, the arm being preferably of substantially inverted T section to increase its strength in the vertical plane. The arm is pivoted substantially at its center to shoe 6 by means of a suitable transversely extending pivot pin 17 passing through flanges 8 of the shoe and through the arm. One end of the arm, hereinafter called the "free end," is suitably movably connected by a member 18 with the axle 20 or other portion of the vehicle relatively movable with respect to the frame 2 and upon which the frame is supported by means of the vehicle springs 19 in the well known manner. The other end of the arm adjacent the pivot 12 is provided with a curved transversely extending slot 25 preferably lined with leather or other sound-deadening and cushioning material 26, through which the pin 12 extends, whereby the movement of the arm about pivot 17 is limited through engagement of the pin 12 with the ends of the slot.

For the purpose of permitting relative freedom of movement between the drum and the shoes in one direction only, as for example, when the frame and axle approach each other and to cause the lined shoes to forcibly grip the drum to retard such movement when its direction is reversed, as for example, when the frame and axle relatively separate, I preferably provide suitable means operative to force the shoes together against the drum when moved in one direction relative to the drum and inoperative to force the shoes against the drum when they are moved in the opposite direction, and in the form of the invention shown in Figs. 1 and 2 such means may comprise a spring 30 coiled on a bushing 31 having an integral head 32 adapted to engage a lip 34 integral with shoe 5, the bushing extending freely through a suitable aperture 35 in the lip and lock nuts 36 adjacent one end of the bushing serving to hold the spring in position thereon. The bushing is internally threaded and surrounds an externally threaded pin 37 pivotally connected to arm 15 adjacent its upper extremity and between pivot 17 and shoe 6 by means of a suitable transversely extending pivot pin 39 passing through apertures in a pair of forwardly extending lugs 40 integral with arm 15. For the purpose of constantly maintaining the shoes in contact with the drum, a small coil spring 42, or equivalent means, may be suitably disposed as in a recess formed in a boss 43 on arm 15 in such manner that said spring will tend to rotate arm 15 about pivot 17 which action is operative to lightly force the shoes together and keep them constantly in contact with the drum.

With the parts constructed and assembled preferably substantially as hereinbefore described, the operation of the device when attached to a vehicle may be briefly described as follows, presuming the parts to be in substantially the position shown in Fig. 2, normally assumed when the vehicle is at rest. If the vehicle is now propelled over an uneven surface and the vehicle springs deflected so as to cause axle 20 to approach frame 2, arm 15 will be moved about pivot 17 until the end of slot 25 engages pin 12, as shown in Fig. 1, and if the limit of spring deflection is reached prior to, or coincident with, the time when the end of slot 25 engages pin 12, no relative movement will take place between the shoes and the drum and the springs can, thereafter, straighten out freely and naturally to assume their normal position, the parts of the recoil check again assuming the position shown in Fig. 2. The action just described is substantially that which takes place when the vehicle is propelled over cobble stone pavements or the like, it being understood that the constant succession of small spring deflections caused thereby will merely serve to oscillate arm 15 about pivot 17. However, in case the springs are deflected to an extent to move the free end of arm 15 for a distance greater than that allowed by the length of slot 25, the shoes will be rotated about the drum in the direction of the arrow in Fig. 1, but as during this movement of the shoes, spring 30 is compressed between lip 34 and lock nut 36, the lip in turn resting against the underside of head 32, the spring is inoperative to force the shoes together against the drum so that the relative movement of the drum and shoes will be practically unretarded, the slight amount of friction between the shoe linings and the drum due to the slight pressure of spring 42 being negligible. The deflection of the vehicle springs can therefore take place naturally without any retarding or dampening effect being exerted in opposition thereto. As soon as the relative movement between the frame and axle ceases, however, and these members begin to separate from the action of the vehicle springs in tending to assume their normal position the free end of arm 15 will be pulled downwardly by member 18, the arm turning about pivot 17, until the lower end of slot 25 engages pin 12, this movement of the arm acting to raise head 32 out of engagement with lip 34, as shown in Fig. 2. The reason the above pivoting action takes place, rather than a turning of the entire mechanism around the drum, when the lever 15 is pulled down by member 18, is because the initial gripping of the shoes around the drum offers greater resistance than does the compressing of spring 30 when the parts are properly proportioned. Head 32 now being out of engagement with the lip, spring 30 is no longer restrained and becomes free to press on lip 34 and force the shoes powerfully together against the drum so that great force is required at the free end of arm 15 to rotate the shoes about the drum in the direction shown by the arrow in Fig. 2, whereby the relative movement of separation between the frame and axle is retarded to any desired degree, depending on strength of spring 30, and the vehicle springs brought to rest in their normal position without violent upthrow of the spring supported portions of the vehicle.

When the invention is first applied to a vehicle, the tension of spring 30 may be adjusted by means of the lock nuts 36 to exert the force desired in operation, and this adjustment need never be changed after having been once made, except to compensate for fatigue in the spring, the wear of linings 9 being readily compensated for in this form of the invention by loosening lock nut 45 positioned on the end of pin 37 extending beyond bushing 31 and screwing the bushing upwardly along the pin so that the parts at all times will be kept in such relative position that head 32 will seat on lip 34 when the upper end of slot 25 is nearly in contact with pin 12.

As stated above, my invention includes means to automatically compensate for wear between the friction members in order to avoid the necessity of manual adjustment of the parts if so desired. In fact, I have provided an automatic wear compensating means which is adapted for use with any kind of friction mechanism wherein relative wear between the members is liable to throw the parts out of proper adjustment, and obviously this feature of the invention is not limited in its use to a recoil check such as shown in the drawings but has a wider range of utility in connection with any sort of friction mechanism. I have provided means entirely automatic in its operation for positively taking up wear between the friction members immediately as the same occurs so that the element of any friction device to which the compensating means is applied will be always maintained in accurate adjustment without requiring any attention on the part of the operator. One suitable form of wear compensating means adapted for such uses, is illustrated in Figs. 3, 4 and 5 of the drawings. In this form of the invention, spring 30' surrounds pin 37' and is positioned thereon by lock nuts 36', the upper end of the spring contacting with the lip 34' on shoe 5'. Pin 37' may be provided with an integral flange 50 adapted to contact with the upper surface of the lip and with a suitable yoke 51 adjacent its upper extremity which is arranged to receive a channel-shaped lug 53 integral with arm 15' and extending outwardly therefrom in substantially the position occupied by lugs 40 in the embodiment of the invention heretofore described, a pivot pin 55 extending transversely through the arms of the yoke and through vertically extending slots 56 in the sides of the lug serving to secure the parts together. Within the space formed by the sides of the lug is positioned a cam 60, transversely pivoted on pin 55 and forced constantly against the upper surface of the bottom of lug 53 in the direction of the arrow in Fig. 3 by means of a suitable coil spring 62 which may be disposed in a recess 63 in the side of the cam, one end of the spring being attached to the side of the cam and the other end to pivot pin 55, which is squared adjacent its head and adapted to engage in a correspondingly squared aperture in yoke 51 or otherwise arranged to prevent it from axial rotation. As in the form of the invention previously described, arm 15' is pivoted to flanges 8' of shoe 6' by means of a pivot pin 17', and the underside of the arm between the pin and the extremity of lug 53 is hollowed out to provide space for the revolution of the cam. A small spring, or springs 65 may be suitably attached adjacent the extremities of the shoes to lightly hold the shoes together and keep them constantly in contact with the drum.

It will be evident that this form of the invention as regards its function of permitting substantially free rotation of the shoes in one direction about the drum and of retarding their rotation in the other direction will operate similarly to that form of the invention first described, while the operation of the cam 60 and its attendant parts may be briefly described as follows, presuming the lever 15' to be in the position of lever 15 in Fig. 2. From this position when the vehicle springs are materially deflected the free end of arm 15' will be moved upwardly about pivot 17', thus carrying flange 50 down into contact with lip 34', and confining spring 30' to render same inoperative, after which, further movement of arm 15' will tend to force the shoes apart through the engagement of flange 50 with lip 34', which tendency is resisted, however, by tension spring 65 which keeps the shoes constantly in light contact with the drum. Such further movement of the arm, therefore, instead of forcing the shoes apart results in moving lug 53 downwardly with respect to yoke 51, permitting cam 60 to rotate a slight distance to fill up the gap thus caused between the lug and the cam, thus automatically compensating for any wear of the shoe linings, and constantly maintaining the proper operative relation between the several parts of the invention.

While I have herein illustrated and described certain embodiments of my invention with considerable particularity and have shown them as, and described their operation when, attached to a vehicle, I do not thereby intend to specifically limit myself thereto or to the use of the invention in connection with a vehicle, as various changes and modifications may be made in the details of construction and arrangement of the various parts and the invention may be employed as desired, without departing from the spirit and scope of the invention as described in the appended claims.

Having thus described my invention, what I claim and desire to protect by Letters Patent of the United States is:

1. Mechanism having relatively movable members which when relatively moved in one direction bring into play a continuously-stressed spring to cause frictional resistance to such movement and which when relatively moved in the opposite direction permit said spring to act to render itself inoperative to cause frictional resistance to such movement regardless of the extent of such movement.

2. A recoil check comprising a drum, shoes adapted to contact with said drum and relatively movable with respect thereto, a member, directly connected to one of said shoes, and movable with respect to said shoes, a spring adapted to force said shoes against said drum, and means operative to confine said spring when said member is in one position, and to release said spring when the member is in another position.

3. A recoil check comprising a drum, shoes relatively movable with respect to each other and with respect to said drum, a member pivoted to one of said shoes, a spring adapted to force said shoes against said drum, means to confine said spring when said member is in one position, and to release said spring to force said shoes against said drum, as said member is rotated about said pivot to assume a different position.

4. A recoil check comprising a drum, a pair of shoes relatively movable and movable with respect to said drum, a member pivoted to one of said shoes, means to limit the movement of said member with respect to said shoe, a spring adapted to force said shoes against said drum, means operative to confine said spring during relative movement of said shoes and said drum in one direction, and means actuated by the movement of said member, with respect to the shoe to which it is pivoted, operative to release said spring during relative movement of said shoes and said drum in the other direction to force said shoes against said drum.

5. The combination of a plurality of relatively movable members, spring means to force said members together, means to give any desired amount of energy to said spring, means, operated by said spring, to confine the action of said spring during relative movements of said members in one direction and means to nullify said confining means and thereby permit said spring to force said members together when they are moved in the opposite direction.

6. The combination of a plurality of relatively movable members, spring means to force said members together, means to give any desired amount of energy to said spring, means, operated by said spring, to confine the action of said spring during relative movement of said members in one direction, means to nullify said confining means and thereby permit said spring to force said members together when they are moved in the opposite direction, and means automatically operating to compensate for wear between said relatively movable members.

7. The combination with relatively movable members of a spring operative to force said members together, means, operable by said spring, to positively confine said spring during relative movement of said members in one direction, means to release said spring to force said members together when relatively moved in the opposite direction and means operative to automatically compensate for wear between said members whereby said spring is made effective to produce a substantially constant pressure in forcing said members together during and throughout their relative movement, irrespective of said wear.

8. In combination, relatively movable contacting friction members, means operative to force said members together, spring-operated means to render said first-mentioned means inoperative to force said members together during their relative movement in one direction and means to automatically compensate for wear between said members and thus maintain any given force exerted by the first-mentioned means.

9. The combination of members having adjacent frictional surfaces, a spring acting as a means for transmitting power to force said surfaces together during their relative movement in one direction and means actuated by said spring to render said spring inoperative to transmit power to force said members together during their total possible relative movement in the opposite direction regardless of the speed of such movement.

10. The combination of relatively movable members and spring means operative to cause any desired amount of constant resistance to and throughout relative movement of said members in one direction and means, initiated by said spring means, to render said spring means inoperative to cause said resistance.

11. The combination of relatively movable members, a stressed spring adapted to force the same together, and a spring-carrying member having an abutment for said spring, said carrying member having means adapted to render said spring inoperative to affect said relatively movable members, said parts being so positioned that the constant tendency of said spring is to force said last named means into position to render said spring inoperative to affect said relatively movable members.

12. In a motion check, the combination of relatively movable members, a spring operable to force said members together, means, including said spring, to render said spring inoperative to force said members together and means to automatically maintain constant the force adapted to be exerted by said spring regardless of wear between said members.

13. The combination of a plurality of relatively movable members, a continuously-stressed spring adjustable to exert any desired pressure to force said members together but which spring is inert to thus act on said members until brought into play by a force wholly independent of the spring itself, and means to bring said spring into play to thus force said members together throughout any relative movements of the members in one direction.

14. The combination of a member and a plurality of elements adapted to engage the same, said elements and member being relatively movable, a continuously-stressed spring adapted to exert any desired amount of pressure to force said elements and member together but prevented from acting throughout relative movement of same in one direction, means to regulate the amount of pressure exerted by said spring, and means attached to one of said elements and operative to compress the spring to cause the same to act on the other element whereby said elements forcibly engage said member when they are relatively moved in the opposite direction.

15. In combination, relatively movable friction members spring actuated means to maintain these members in contact with one another, means, including a continuously-stressed spring, to force these members together during their relative movement in one direction only and means to automatically maintain the force exerted by said second mentioned means regardless of wear between said first-mentioned members.

16. In combination, relatively movable members, a continuously-stressed spring, means to adjust the power of said spring, means, including the force of said spring and independent of relative movement of said first mentioned members, to confine the power of said spring and means to release this power to force said first-mentioned members together.

17. The combination of a plurality of relatively movable members, a continuously-stressed spring adjustable to any desired power and adapted to force these members together, but which, in combination with other elements, renders itself inoperative to so act, and means to further stress said spring and cause it to force said members together.

18. The combination of a plurality of relatively movable friction members, means to cause frictional resistance to relative movement between said members in one direction, an actuating element directly connected to one of said members, said element and members being relatively movable, and means whereby said resistance causing means is confined throughout the entire relative movement between said actuating element and a member in one direction.

19. In combination, relatively movable friction members, a spring adapted to force said members together, means including said spring, and independent of the relative movement of said members, to render said spring inoperative to force said members together and means, independent of the relative movement of said members, to overcome said first mentioned means and thus render said spring operative to force said members together.

20. The combination of relatively movable friction members, a spring adapted to force said members together, and an element pivotally attached to one of said members and which, when in one position, renders said spring operative to force said members together and when in another position renders said spring inoperative to force said members together.

21. The combination of relatively movable members, a stressed spring adapted to force the same together, and a spring-carrying member having an abutment for said spring, said carrying member having a second abutment movable into position to confine said spring in inoperative position, the tendency of said spring being to move said carrying member into position to thus confine said spring, and means for moving said carrying member into position to release said spring to permit the same to act upon said first named members.

22. In combination, relatively movable friction members, a spring adapted to force said members together, means, including said spring, to render said spring inoperative to force said members together, means to overcome said first mentioned means and thus render said spring operative to force said members together and means to automatically maintain, regardless of wear resulting from relative movement of said friction members, the pressure exerted by such spring to force said members together.

23. The combination of a plurality of relatively movable members, a spring adapted to bear on one of the same, to force said members together, means adapted to clamp said spring in a position in which it is inoperative to affect said members, and means connecting said spring and clamping means, so arranged that the constant tendency of said spring is to move said clamping means into clamping position.

24. The combination of relatively movable members, an actuator, connected to one of the same and adapted to move it relatively to the other, and to move relatively to both said members, a spring adapted to press said members together, means preventing operation of said spring upon said members while said actuator moves in one direction, and means for enabling said spring to act upon said members while said actuator moves in the opposite direction.

25. The combination of members positioned to move relatively to each other in opposite directions, and to be pressed toward each other, to frictionally bind the same, a spring operative to press said members toward each other, during certain relative movements only, thereof, and means for holding said members in approximately constant light frictional contact during other relative movements thereof, said means including an automatically acting device for compensating for wear between said members.

26. The combination of relatively movable friction members, a continuously-stressed spring adapted to force said members together and operative to force said members together when further stressed, and means, independent of the relative movement of said members, to further stress said spring.

27. The combination of relatively movable friction members, a continuously-stressed spring adapted to force said members together and operative to force said members together when further stressed, and means, independent of the relative movement of said members, to further stress said spring, and means to automatically maintain, regardless of wear resulting from relative movement of said friction members, the power exerted by said spring to force said members together.

28. In a motion check, the combination of relatively movable friction members, a continuously-stressed spring adapted to force said members into binding engagement, and an element, movable with respect to one of said members, which, when moved relatively thereto in one direction, forces said spring to force said members into binding engagement.

29. In a motion check, the combination of relatively movable friction members, a continuously-stressed spring adapted to force said members into binding engagement, an element, movable with respect to one of said members, which, when moved relatively thereto in one direction, forces said spring to force said members into binding engagement, and means to automatically maintain, regardless of wear resulting from relative movement of said friction members, the force exerted by said spring for a given movement of said element relative to one of said members.

In witness whereof I have hereunto set my hand this 27th day of July, 1916.

JOHN W. WATSON.